(12) United States Patent
Calvert

(10) Patent No.: US 6,788,619 B2
(45) Date of Patent: Sep. 7, 2004

(54) CONCENTRATING SEISMIC ENERGY IN A SELECTED TARGET POINT IN AN UNDERGROUND FORMATION

(75) Inventor: Rodney William Calvert, Rijswijk (NL)

(73) Assignee: Shell Oil Company, Houston, TX (US)

(*) Notice: Subject to any disclaimer, the term of this patent is extended or adjusted under 35 U.S.C. 154(b) by 0 days.

(21) Appl. No.: 10/235,004

(22) Filed: Sep. 4, 2002

(65) Prior Publication Data

US 2003/0048695 A1 Mar. 13, 2003

(51) Int. Cl.$^7$ ................................................ G01V 1/38
(52) U.S. Cl. ........................ 367/61; 367/27; 367/46; 367/73; 702/18
(58) Field of Search ............................ 367/22, 27, 46, 367/51, 61, 73; 702/14, 18

(56) References Cited

U.S. PATENT DOCUMENTS

| | | | |
|---|---|---|---|
| 2,745,507 A | 5/1956 | Bodine, Jr. et al. | 181/5 |
| 3,268,859 A | 8/1966 | Watts | 340/15.5 |
| 4,819,214 A | 4/1989 | Gutowski et al. | 367/27 |
| 4,847,813 A * | 7/1989 | Alam et al. | 367/57 |
| 4,955,952 A | 9/1990 | Williams et al. | 181/111 |
| 5,233,567 A * | 8/1993 | Calvert | 367/27 |
| 5,265,068 A * | 11/1993 | Wang et al. | 367/73 |
| 5,396,955 A | 3/1995 | Howlett | 166/249 |
| 5,540,093 A * | 7/1996 | Levin | 73/151 |
| 5,693,885 A * | 12/1997 | Neidell | 73/597 |
| 5,724,310 A * | 3/1998 | Stankovic et al. | 367/51 |
| 5,826,653 A | 10/1998 | Rynne et al. | 166/245 |
| 6,002,642 A | 12/1999 | Krebs | 367/73 |

FOREIGN PATENT DOCUMENTS

| | | | |
|---|---|---|---|
| EP | 3073885 | 8/1989 | G01V/1/00 |
| FR | 1480127 | 5/1967 | |
| WO | 01/29581 A1 | 4/2001 | G01V/1/40 |

OTHER PUBLICATIONS

Beresnev, I. and Paul A. Johnson: "Elastic–wave Stimulation of Oil Production: A Review of Methods and Results", Geophysics, Society of Exploration Geophysicists, Tulsa, OK, vol. 59, No. 6, pp. 1000–1017.

* cited by examiner

Primary Examiner—Nelson Moskowitz

(57) ABSTRACT

Providing a set of seismic sources in a focusing array to enable concentrating seismic energy in a selected target point (k) in an underground formation, by performing a standard seismic survey of the underground formation using a set of impulsive seismic sources and a set of downhole seismic receivers j, and recording the signals $u_{ij}(t)$, selecting a position k to be the target point; obtaining from the signals $u_{ij}(t)$ the one-way travel times $\tau_{ik}$ from a number of sources i to the target point at the location k; and calculating $t_i = t_0 - \tau_{ik}$ to obtain the activating times $t_i$ at which the impulsive seismic sources i have to be activated, in order to get a focusing array of the seismic sources i of which the seismic waves arrive at the target point k in phase at time $t_0$.

14 Claims, 2 Drawing Sheets

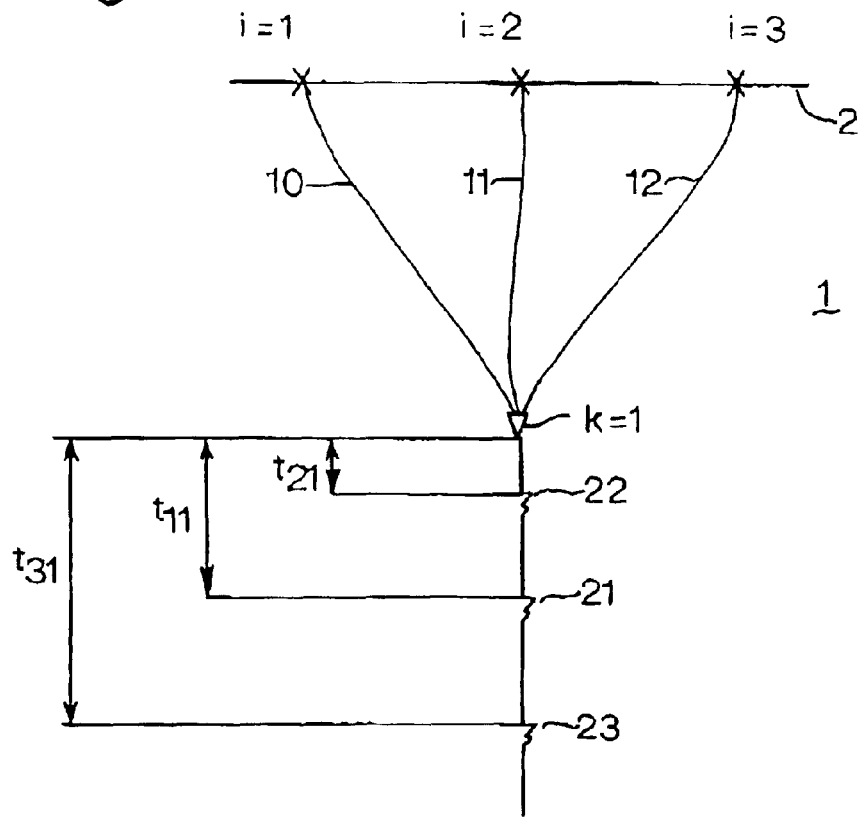
Fig.2.a.
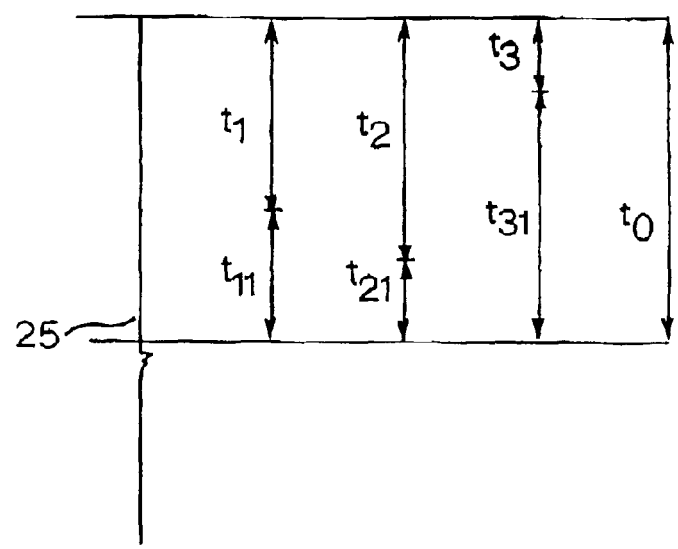
Fig.2.b.

CONCENTRATING SEISMIC ENERGY IN A SELECTED TARGET POINT IN AN UNDERGROUND FORMATION

FIELD OF THE INVENTION

The present invention is directed toward a method for performing a seismic survey and processing the data received from said survey, more particularly, a method for activating a seismic source and processing the survey data in a manner that effectively focuses seismic signal return on a selected point within a subterranean formation.

BACKGROUND OF THE INVENTION

A seismic source is a device that releases energy in the form of an acoustic wave. Basically there are two types of seismic sources, an impulsive seismic source of which the waveform cannot be controlled and a waveform-controllable seismic source. Examples of an impulsive seismic source are an explosive device, a dropping mass or an implosive device, and the signal generated by an impulsive seismic source is a pulse. The waveform of an impulsive seismic source cannot be controlled. A waveform-controllable seismic source is a vibrator that generates a controlled wave train. The seismic sources are used to make a seismic survey of the structure of an underground formation.

Making a seismic survey of the structure of an underground formation comprises activating the seismic sources to generate seismic waves; allowing the seismic waves to travel through the underground formation in which they are reflected by acoustic-impedance contrasts and refracted through members having a variable velocity; and receiving and recording the seismic waves by seismic receivers. The arrival times of the seismic waves are observed to obtain a result that can be interpreted. Common seismic survey techniques generally include one or more seismic sources and multiple seismic receivers, and generating and recording multiple sets of seismic waves. Source and receiver placement may vary, with both source(s) and receivers being located on the ground, in the formation of interest or some combination of both. Similarly, in a marine environment, the sources and receivers may be towed, on the sea floor or a combination of both. In a borehole seismic survey, receivers, sources, or both may be placed in a well, at various formation depths to perform.

SUMMARY OF THE INVENTION

It is an object of the present invention to use the information obtained from the seismic survey to determine how to activate a seismic source such that the seismic energy receive in a target point in the undergound formation has a prescribed shape.

As observed above, there are two kinds of seismic sources, impulsive seismic sources and waveform-controllable seismic sources. For the impulsive seismic sources it is an object to concentrate the seismic energy in a target point.

In the present method of concentrating seismic energy, a borehole seismic survey is made with multiple impulsive seismic sources i on the surface and multiple seismic receivers i placed in multiple boreholes at the formation depth of interest. A seismic survey is made in which the sources i are activated and the signals are recorded by the seismic receivers to form the data set $u_{ij}(t)$. target position k in the formation at depth of interest is then selected as the focus point. The one-way travel times from each sources to the target point $\tau_{ik}$ is then calculated from the received signal set $u_{ij}(t)$. An activation time $t_i = t_0 - \tau_{ik}$ is calculated for each source, where $t_0$ is the time at which the energy from all of the sources arrives at target k in phase. The seismic array sources are then activated according to $t_i$ to provide a focused source wherein all the energy arrives at target k at $t_0$ and a second received signal set is created.

This method is suitably applied in case the target point coincides with a seismic receiver k. However, in case the target point l does not coincide with a seismic receiver k, a correction has to be applied. The correction on the activation time of the sources i is $\Delta t_i = \tau_{ik} - \tau_{il}$, wherein $\tau_{il}$ is the one-way travel time from source i to the target point l. The corrected activation time for the seismic source i is then $t^{corr}_i = t_i + \Delta t_i$.

Suitably the one-way travel times are calculated with a velocity model that is obtained from signals $u_{im}(t)$, wherein m refers to a set of seismic receivers, at least one of which is located at surface.

For the waveform-controllable seismic sources it is an object of the present invention to enable concentrating seismic energy in a selected target point in an underground formation, wherein the wave at the target point has a predetermined desired waveform.

In this instance, at least one focused waveform-controllable seismic source i is located on the surface and a set of downhole receivers i located in a subterranean formation. A seismic survey is made wherein said at least one seismic source i is activated the waveform(s) are recorded by each receiver i to form a data set $u_{ij}(t)$, where each source is activated by a signal $s_i(t)$. A target k is then selected in the subterranean formation from the set of seismic receivers to be the target point k. The direct part $u^d_{ik}(t)$ of the signal $u_{ik}(t)$ is obtained and used to create an inverse filter $(u^d_{ik}(t))^{-1}$. A waveform is then selected $f_k(t-t_0)$ to be focused at the downhole seismic receiver k at time $t=t_0$. Based on the above, a new activation sequence for seismic sources i is determined $s^{new}_i(t) = s_i(t) \otimes (u^d_{ik}(t))^{-1} \otimes f_k(t-t_0)$ resulting in a focused source I in which the waves arrive at the downhole receiver k with the desired waveform $f_k(t)$ a time $t_0$.

As with the impulsive seismic source, the present invention further contemplates a target l that does not coincide with receiver k. A correction factor is determined by $\Delta t^{corr}_i = \tau_{ik} - \tau_{il}$ where $\tau_{il}$ is the estimated one-way travel time from source I to target point l, such that $s^{new}_i(t) = s^{new}_i(t + \Delta t_i)$.

Suitably, the one-way travel time to the target location is calculated using a velocity model obtained from signals $u_{im}(t)$, wherein m refers to a set of seismic receivers, at least one of which is located at surface.

In the specification and the claims the symbol $\otimes$ denotes convolution.

BRIEF DESCRIPTION OF THE DRAWINGS

The invention will now be described by way of example in more detail with reference to the accompanying drawings, wherein FIG. 2 shows schematically how the activation times are calculated.

DETAILED DESCRIPTION OF THE PREFERRED EMBODIMENT

Figure 1:
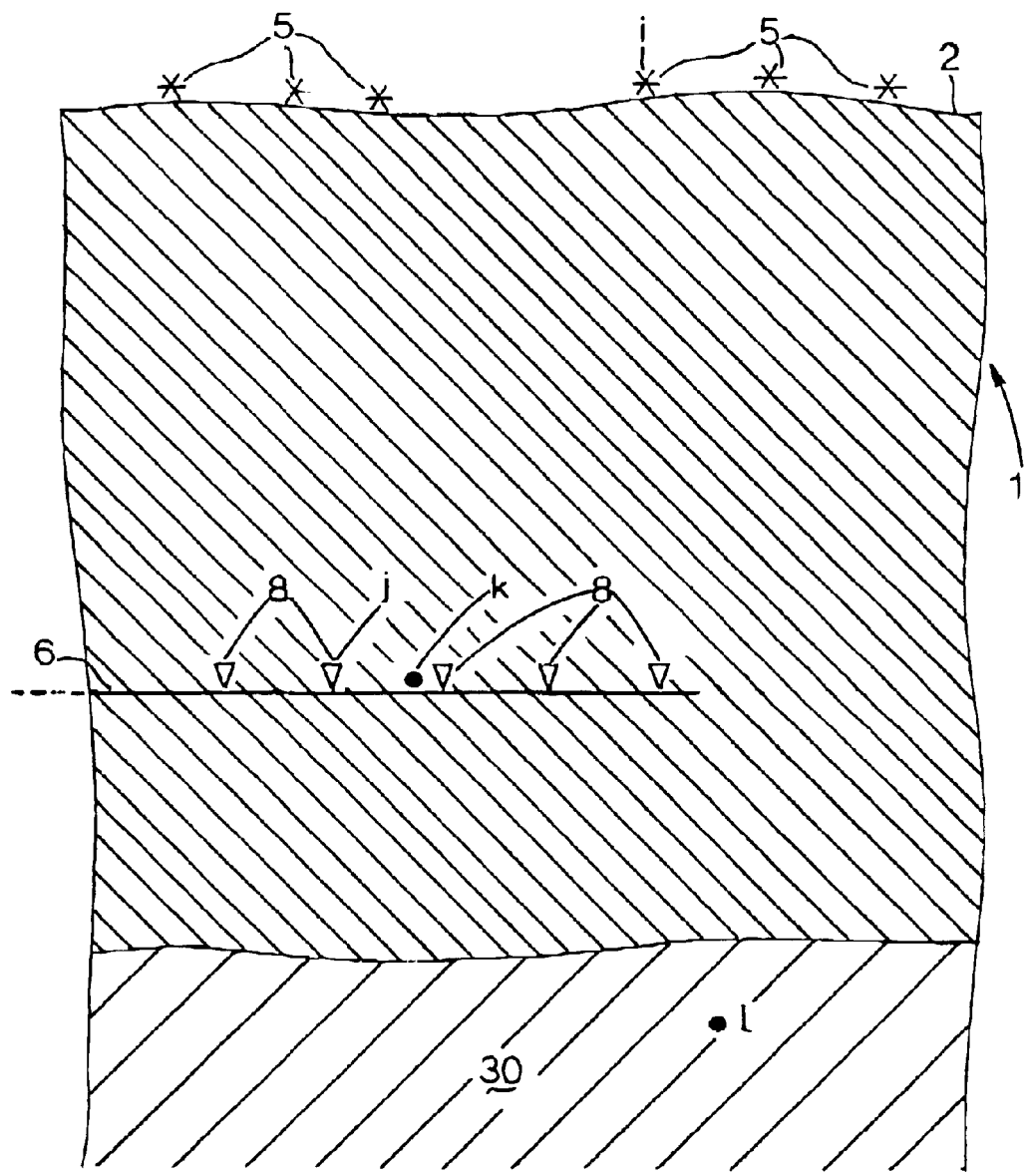
FIG. 1 shows an embodiment of the invention.

Reference is now made to FIG. 1, showing schematically and not to scale a section 1 of the earth having a surface 2. At the surface 2 are located impulsive seismic sources 5, and in a borehole 6 are located downhole seismic receivers 8.

The first step according to the method according to the present invention is performing a seismic survey of the underground formation using a set of impulsive seismic sources i and a set of downhole seismic receivers j, and recording the signals $u_{ij}(t)$. Thus for each pair i,j there is one seismic signal $u_{ij}(t)$. In the embodiment shown the set of impulsive seismic sources i consists of one or more of the impulsive seismic sources 5. For the sake of clarity we have indicated one of the sources with the reference i. The set of downhole seismic receivers j consists of one or more of the seismic receivers 8, and for the sake of clarity we have indicated one of the receivers with the reference j.

The next step is selecting a position that is to be used as a target point. In this case we selected the dot k to represent the position of the target point, which coincides with one of the receivers 8.

The seismic signals $u_{ij}(t)$ are used to make a velocity model, and that velocity model is used to calculate the one-way travel times $\tau_{ik}$ from a number of sources i to the target point at the location k (which coincides with one of the seismic receivers 8). Please note that making a velocity model and calculating the one-way travel times from it is well known, and will therefore not be discussed in this specification. The velocity model can also be obtained from signals $u_{im}(t)$, wherein m refers to a set of seismic receivers, at least one of which is located at surface.

The one-way travel times $\tau_{ik}$ are now used to calculate the activation times $t_i$ at which the impulsive seismic sources i have to be activated, in order to get a focusing array of the seismic sources i of which the seismic waves arrive at the target point k in phase at time $t_0$. The activation times $t_i$ are calculated according to the expression $t_i=t_0-\tau_{ik}$.

FIGS. 2a and 2b show how the activation times for three impulsive seismic sources arranged at the surface 2 of the formation 1 are calculated. The wave paths from the sources to the receiver are referred to with reference numerals 10, 11 and 12. Reference numeral 15 refers to a fictitious trace that is a combination of the signals $u_{11}$, $u_{21}$ and $u_{31}$. When the impulsive seismic sources i=1, i=2 and i=3 are activated at the same time, the signal recorded with seismic receiver k=1 shows the arrivals 21, 22 and 23 of the three seismic waves. We do not show the remainder of the signals consisting of reflections.

The one-way travel times are $\tau_{11}$, $\tau_{21}$ and $\tau_{31}$, respectively, wherein (in this example) $\tau_{21}<\tau_{11}<\tau_{31}$. To ensure that the seismic waves arrive at the target point k in phase at time $t_0$—signal 25 in FIG. 2b—the activation times must be calculated as shown in FIG. 2b, wherein $t_3<t_1<t_2$.

Because the target point k coincides with a seismic receiver, the activation times are so calculated that the seismic waves arrive at the seismic receiver at k in phase at time $t_0$. However if the target point k does not coincide with a seismic receiver the one-way travel times $\tau_{ik}$ have to be estimated from the velocity model, or a correction has to be applied.

Thus the invention gives a simple method for concentrating the seismic energy of a set of impulsive seismic sources in a target point.

An application of this method is creating a virtual source at the position k, which may coincide with a seismic receiver 8. The waves emitted from the virtual source at the position k can be used to get a seismic image of a formation layer 30, see FIG. 1. Moreover the signal from the receiver 8 at the position k will provide a check on the validity of the velocity model used to calculate the one-way travel times. Thus the method of the present invention offers the opportunity to check the validity of the velocity model, and it provides a method for providing an image of the formation layer 30 using a source k that is closer to it then the sources 5.

Assume now that this formation layer 30 is an oil-bearing layer from which oil is produced via a well that is not shown in FIG. 1. If now a target point l is selected inside the formation layer 30 the concentrated seismic energy can be used to mobilize the oil in the formation layer 30 and thus the oil production is augmented.

The activation times used to ensure that the seismic waves arrive at the location l in phase at a time $t_0$ can be estimated from the velocity model.

However, if we already know the activation times $t_i$ that are calculated to activate the impulsive seismic sources such that the seismic waves arrive at the seismic receiver at k in phase at time $t_0$, the activation times used to ensure that the seismic waves arrive at the location l in phase at time $t_0$ can be found by a applying the following correction $\Delta t_i=\tau_{ik}-\tau_{il}$, wherein $\tau_{il}$ is the estimated one-way travel time from source i to the target point l. Adding the correction to the above equation for the activation times gives $t^{corr}{}_i=t_i+\Delta t_i=t_0-\tau_{ik}+\Delta t_i=t_0-\tau_{il}$, which is the activation time that has to be used in order that the seismic waves arrive at the location l in phase at time $t_0$.

We will now discuss an embodiment of the present invention that is applicable to the second group of seismic sources, the waveform-controllable seismic sources. In this embodiment a mathematical method is used to determine the signal with which the seismic source has to be activated in order that a desired waveform $f_k(t-t_0)$ is focused at the location of the downhole seismic receiver k at time $t=t_0$. The method will be discussed with reference to FIG. 1, wherein a difference with the above-described method is that the sources are waveform-controllable seismic sources.

The first step of the method is as discussed above, performing a seismic survey of the underground formation using the at least one waveform-controllable source i, and a set of downhole seismic receivers j, and recording the signals $u_{ij}(t)$, wherein each source is activated by a signal $s_i(t)$. Then a downhole seismic receiver k is selected from the set of seismic receivers to be the target point.

The next step is taking the direct part $u^d{}_{ik}(t)$ of the signal $u_{ik}(t)$ and making an inverse filter $(u^d{}_{ik}(t))^{-1}$ of the direct part of the signal.

Then the desired waveform $f_k(t-t_0)$ has to be selected.

The new signal with which the seismic source i is to be activated is calculated in accordance with the expression $s^{new}{}_i(t)=s_i(t)\otimes(u^d{}_{ik}(t))^{-1}\otimes f_k(t-t_0)$. When the seismic source with this input signal, one obtains a focused source i of which the waves arrive at the downhole seismic receiver k with the desired wave-form $f_k(t)$ starting at time is $t_0$.

When more than one seismic source is used, the above described method is applied to calculate for each seismic source i the new input signal $s^{new}{}_i(t)$.

This method can be applied to create a virtual source at the position k, which may coincide with a seismic receiver 8. The waves emitted from the virtual source at the position k can be used to get a seismic image of a formation layer 30, see FIG. 1. Moreover the signal from the receiver 8 at the position k will provide a check on the validity of the velocity model used to calculate the one-way travel times. Thus the method of the present invention offers the opportunity to check the validity of the velocity model, and it provides a method for providing an image of the formation layer 30 using a source k that is closer to it then the sources 5.

The step of taking the direct part of the signal and making an inverse filter of the direct part of the signal can be performed in the time domain or in the frequency domain using Fourier Transforms.

The Fourier Transform of the direct part of the signal is $$U_{ik}^d(f) = \int_{-\infty}^{\infty} u_{ik}^d(t) \cdot e^{-2i\pi ft} dt.$$

The inverse filter is $(u_{ik}^d(t))^{-1}$ so selected that its Fourier Transform is $1/U_{ik}^d(f)$.

For the sake of completeness, we would observe that ideally a spike is obtained at $t=t_0$ when the inverse filter is convolved with the delayed direct part of the signal. In equations: the convolution is $(u_{ik}^d(t))^{-1} \otimes (u_{ik}^d(t-t_0))$, the Fourier Transform of the delayed direct part $u_{ik}^d(t-t_0)$ of the signal is $(e^{-i2\pi ft_0}) \cdot (U_{ik}^d(f))$, and the Fourier Transform of the convolution is $e^{-i2\pi ft_0}$. The inverse Fourier transform of $e^{-2i\pi ft_0}$ is $\delta(t-t_0)$, which is the Dirac delta function at $t=t_0$.

The desired waveform at $t=t_0$ can be obtained by convolving the Dirac delta function at $t=t_0$ with the desired waveform, in equation:

$$f_k(t-t_0) = \delta(t-t_0) \otimes f_k(t).$$

Given the limited bandwidth of the data, the inverse filter, $(u_{ik}^d(t))^{-1}$, is suitably stabilized by convolving it with a band limited desired response.

The above-described method is applicable in case the target point coincides with a seismic receiver k. However, in case the target point does not coincide with a seismic receiver k, a correction has to be applied. And this embodiment of the invention will now be discussed.

The first step of the method wherein the correction is applied is performing a seismic survey of the underground formation using the at least one waveform-controllable source i, and a set of downhole seismic receivers j, and recording the signals $u_{ij}(t)$, wherein each source is activated by a signal $s_i(t)$. Then a position I is selected to be the target point, wherein the position I is near a downhole seismic receiver k of the set of seismic receivers, and determining the one-way travel times $\tau_{ik}$ from a number of sources i to the seismic receiver k near the target point at the location I. Subsequently the direct part $u_{ik}^d(t)$ of the signal $u_{ik}(t)$ is used to make an inverse filter $(u_{ik}^d(t))^{-1}$ of it.

A desired waveform $f_k(t-t_0)$ to be focused at the location of the downhole seismic receiver k at time $t=t_0$ is selected. The new signal with which the seismic source i is to be activated is calculated in accordance with the expression $s_i^{new}(t) = s_i(t) \otimes (u_{ik}^d(t))^{-1} \otimes f_k(t-t_0)$. The result is a focused source i of which the waves arrive at the downhole seismic receiver k with the desired waveform $f_k(t)$ starting at time is $t_0$. However, because the target point l does not coincide with the seismic receiver k, a correction on the signal has to be applied. The correction on the signal of the source(s) i is a time shift $\Delta t_i^{corr} = \tau_{ik} - \tau_{il}$, wherein $\tau_{il}$ is the estimated one-way travel time from source i to the target point l. The corrected new signal becomes $s_i^{newc}(t) = s_i^{new}(t + \Delta t_i^{corr})$.

Suitably, determining the one-way travel time to the target point l comprises obtaining from the signals $u_{ij}(t)$ a velocity model, and calculating the one-way travel times $\tau_{il}$ with the velocity model.

This method can for example be applied to concentrate seismic energy in a target point l in an oil-bearing formation layer 30 in order to mobilize the oil in the formation layer 30.

The focused set of seismic sources is suitably used to provide high energy at the target point. Applications may include enhancing oil production by increased mobilization in area around the target point; enhancing the signal-to-noise ratio of seismic imaging; enhancing the signal to noise ratio of seismic-electric effects in which the seismic signals are used to generate detectable electromagnetic responses; and transmission of signals or energy to remote devices.

What is claimed is:

1. A method of providing a set of seismic sources in a focusing array to enable concentrating seismic energy in a selected target point in an underground formation, which method comprises the steps of:

(a) performing a seismic survey of the underground formation using a set of impulsive seismic sources i and a set of downhole seismic receivers j, and recording the signals $u_{ij}(t)$;

(b) selecting a position k to be the target point;

(c) determining from the signals $u_{ij}(t)$ the one-way travel times $\tau_{ik}$ from sources i to the target point at a location k; and (d) calculating $t_i = t_0 - \tau_{ik}$ to obtain the activating times $t_i$ at which the impulsive seismic sources i have to be activated, in order to get a focusing array of the seismic sources i of which the seismic waves arrive at the target point k in phase at time $t_0$.

2. The method according to claim 1, wherein a correction $\Delta t_i = \tau_{ik} - \tau_{i1}$ on the activation time of the sources i is applied for a target point 1 differing from the target point k, wherein $\tau_{i1}$ is the one-way travel time from source i to the target point 1.

3. The method according to claim 1, wherein determining the one-way travel time to the target point comprises obtaining from signals $u_{im}(t)$ a velocity model, and calculating the one-way travel times from the seismic sources i to the target point with the velocity model, wherein m refers to a set of seismic receivers, at least one of which is located at surface.

4. The method according to claim 2, wherein determining the one-way travel time to the target point comprises obtaining from signals $u_{im}(t)$ a velocity model, and calculating the one-way travel times from the seismic sources i to the target point with the velocity model, wherein m refers to a set of seismic receivers, at least one of which is located at surface.

5. A method of providing at least one focused waveform-controllable seismic source to enable concentrating seismic energy in a selected target point in an underground formation, which method comprises the steps of:

(a) performing a seismic survey of the underground formation using the at least one waveform-controllable source i, and a set of downhole seismic receivers j, and recording the signals $u_{ij}(t)$, wherein each source is activated by a signal $s_i(t)$;

(b) selecting a downhole seismic receiver k from the set of seismic receivers to be the target point;

(c) taking the direct part $u_{ik}^d(t)$ of the signal $u_{ik}(t)$ and making an inverse filter $(u_{ik}^d(t))^{-1}$ of the direct part of the signal;

(d) selecting a desired waveform $f_k(t-t_0)$ to be focused at the location of the downhole seismic receiver k at time $t=t_0$; and (e) calculating the new signal with which the seismic source i is to be activated in accordance with $s_i^{new}(t) = s_i(t) \otimes (u_{ik}^d(t))^{-1} \otimes f_k(t-t_0)$ to get a focused source i of which the waves arrive at the downhole seismic receiver k with the desired waveform $f_k(t)$ starting at time is $t_0$.

6. A method of providing at least one focused waveform-controllable seismic source to enable concentrating seismic energy in a selected target point in an underground formation, which method comprises the steps of:

(a) performing a seismic survey of the underground formation using the at least one waveform-controllable source i, and a set of downhole seismic receivers j, and recording the signals $u_{ij}(t)$, wherein each source is activated by a signal $s_i(t)$;

(b) selecting a position 1 to be the target point, wherein the position 1 is near a downhole seismic receiver k of the set of seismic receivers, and determining from the signals $u_{ij}(t)$ the one-way travel times $\tau_{ik}$ from a number of sources i to the seismic receiver k near the target point at the location 1;

(c) taking the direct part $u^d_{ik}(t)$ of the signal $u_{ik}(t)$ and making an inverse filter $(u_{dik}(t))^{-1}$ of the direct part of the signal;

(d) selecting a desired waveform $f_k(t-t_0)$ to be focused at the location of the downhole seismic receiver k at time $t=t_0$; and (e) calculating the new signal with which the seismic source i is to be activated in accordance with $s^{new}_i(t)=s_i(t)\otimes(u^d_{ik}(t))^{-1}\otimes f_k(t-t_0)$ to get a focused source i of which the waves arrive at the downhole seismic receiver k with the desired wave form $f_k(t)$ starting at time is $t_0$, and applying a correction on the signal with which the seismic source i is activated, wherein the correction is given by $\Delta t^{corr}_i=\tau_{ik}-\tau_{i1}$, $\tau_{i1}$ being the estimated one-way travel time from source i to the target point 1, such that $s^{newc}_i(t)=s^{new}_i(t-\Delta^{corr}t_i)$.

7. The method according to claim 6, wherein determining the one-way travel time to the target point 1 comprises obtaining from signals $u_{im}(t)$ a velocity model, and calculating the one-way travel times $\tau_{i1}$ with the velocity model, wherein m refers to a set of seismic receivers, at least one of which is located at surface.

8. A method for focusing seismic energy generated by an array of impulsive seismic sources to a target point in an underground formation, the steps comprising:

(a) performing a seismic survey of the underground formation by generating seismic energy utilizing a set of impulsive seismic sources i and receiving said seismic energy utilizing a set of downhole seismic receivers j, and generating and recording signals $u_{ij}(t)$;

(b) selecting a position k as a target point;

(c) determining from signals $u_{ij}(t)$ one-way travel times $\tau_{ik}$ from said sources i to said target point;

(d) calculating $t_i=t_0-\tau_{ik}$ to obtain activating times $t_i$ at which impulsive seismic sources i have to be activated, in order focus seismic energy generated by said seismic sources i to arrive at said target point in phase at time $t_0$; and (e) activating said array of seismic sources according to activation times $t_i$ and receiving and recording signals $u_{ik}(t)$ at said seismic receiver k.

9. The method of claim 8, wherein a correction $\Delta t_i=\tau_{ik}-\tau_{i1}$ on the activation time of said sources i is applied for a target point 1 differing from the target point k, wherein $\tau_{i1}$ is a one-way travel time from source i to the target point 1.

10. The method according to claim 8, wherein determining one-way travel time to the target point comprises obtaining from signals $u_{im}(t)$ a velocity model, and calculating the one-way travel times from the seismic sources i to the target point with the velocity model, wherein m refers to a set of seismic receivers, at least one of which is located at surface.

11. The method according to claim 9, wherein determining one-way travel time to the target point comprises obtaining from signals $u_{im}(t)$ a velocity model, and calculating the one-way travel times from the seismic sources i to the target point with the velocity model, wherein m refers to a set of seismic receivers, at least one of which is located at surface.

12. A method for focusing seismic energy generated by at least one waveform-controllable seismic source at a selected target point in an underground formation, the steps comprising:

(a) performing a seismic survey of the underground formation by generating seismic energy utilizing at least one waveform-controllable source i, and a set of downhole seismic receivers j, and recording the signals $u_{ij}(t)$, wherein each source is activated by a signal $s_i(t)$;

(b) selecting a downhole seismic receiver k from the set of seismic receivers to be the target point;

(c) taking the direct part $u^d_{ik}(t)$ of the signal $u_{ik}(t)$ and making an inverse filter $(u^d_{ik}(t))^{-1}$ of the direct part of the signal;

(d) selecting a desired waveform $f_k(t-t_0)$ to be focused at the location of the downhole seismic receiver k at time $t=t_0$;

(e) calculating the new signal with which the seismic source i is to be activated in accordance with $s^{new}_i(t)=s_i(t)\otimes(u^d_{ik}(t))^{-1}\otimes f_k(t-t_0)$ to get a focused source i of which the waves arrive at the downhole seismic receiver k with the desired waveform $f_k(t)$ starting at time is $t_0$;

(f) activating said at least one seismic source i in accordance with activation time $s^{new}_i(t)=s_i(t)\otimes(u^d_{ik}(t))^{-1}\otimes f_k(t-t_0)$ and receiving and recording signals $u_{ik}(t)$ at said seismic receiver k.

13. The method according to claim 12, wherein a target point 1 is offset from receiving k, further including the step of applying a correction on seismic source i activation time activated, wherein the correction is given by $\Delta t^{corr}_i=\tau_{ik}-\tau_{i1}$, $\tau_{i1}$ being an estimated one-way travel time from source i to the target point 1, such that $s^{newc}_i(t)=s^{new}_i(t-\Delta t^{corr}_i)\otimes(u^d_{ik}(t-\Delta t^{corr}_i))^{-1}\otimes f_k((t-\Delta t^{corr}_i)-t_0)$.

14. The method according to claim 13, wherein determining one-way travel time to the target point 1 comprises obtaining from signals $u_{im}(t)$ a velocity model, and calculating one-way travel times $\tau_{i1}$ with the velocity model, wherein m refers to a set of seismic receivers, at least one of which is located at surface.

* * * * *